US012202173B2

(12) United States Patent
Iga

(10) Patent No.: US 12,202,173 B2
(45) Date of Patent: Jan. 21, 2025

(54) METHOD OF MANUFACTURING MONOCRYSTALLINE SILICON SUBSTRATE

(71) Applicant: DISCO CORPORATION, Tokyo (JP)

(72) Inventor: Hayato Iga, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 283 days.

(21) Appl. No.: 18/045,858

(22) Filed: Oct. 12, 2022

(65) Prior Publication Data

US 2023/0119333 A1 Apr. 20, 2023

(30) Foreign Application Priority Data

Oct. 15, 2021 (JP) ................................ 2021-169244

(51) Int. Cl.
*H01L 21/322* (2006.01)
*B28D 5/00* (2006.01)

(52) U.S. Cl.
CPC .................................. *B28D 5/0011* (2013.01)

(58) Field of Classification Search
CPC ..... B28D 5/0011; B28D 5/0052; B23K 26/38
USPC .......................................................... 438/795
See application file for complete search history.

(56) References Cited

U.S. PATENT DOCUMENTS 7,662,700 B2 * 2/2010 Hoshino ........... H01L 27/14683 438/795
7,939,430 B2 * 5/2011 Sakamoto ............ B28D 5/0052 438/797
2008/0035611 A1 * 2/2008 Kuno .................. C03B 33/0222 219/69.1
2009/0212396 A1 * 8/2009 Sugiura .................. B23K 26/53 257/618
2019/0304769 A1 * 10/2019 Hirata .................... B23K 26/53
2019/0304800 A1 * 10/2019 Yamamoto ............. B28D 5/047
2020/0122911 A1 * 4/2020 Varriano-Marston ........................ B65D 77/2032
2021/0197319 A1 * 7/2021 Hirata .................. B23K 26/352
2021/0221026 A1 * 7/2021 Nomaru ................. B23K 26/53
2021/0316476 A1 * 10/2021 Nomaru ............. B23K 26/0622
2021/0323095 A1 * 10/2021 Hu ....................... B23K 26/064
2022/0379520 A1 * 12/2022 Yamamoto ........... B23K 20/002
2022/0410431 A1 * 12/2022 Honoki .................. B23K 26/53
2023/0073379 A1 * 3/2023 Nomura ............... B28D 5/0052
2023/0119333 A1 * 4/2023 Iga ....................... B28D 5/0011 438/795
2023/0137722 A1 * 5/2023 Iga ..................... B23K 26/0876 225/2
2023/0373129 A1 * 11/2023 Honoki .................. B23K 26/70
2024/0227100 A1 * 7/2024 Omiya ................. B28D 5/0082

FOREIGN PATENT DOCUMENTS

JP 09262826 A 10/1997

* cited by examiner

*Primary Examiner* — Omar Flores Sanchez
(74) *Attorney, Agent, or Firm* — Greer Burns & Crain Ltd.

(57) ABSTRACT

After peel-off layers have been formed in a workpiece of monocrystalline silicon such as an ingot, a bare wafer, or a device wafer with use of a laser beam having a wavelength transmittable through monocrystalline silicon, a substrate is separated from the workpiece along the peel-off layers acting as separation initiating points. The process results in increased productivity for the manufacture of substrates, compared with a process of manufacturing substrates from a workpiece with use of a wire saw.

1 Claim, 13 Drawing Sheets

METHOD OF MANUFACTURING MONOCRYSTALLINE SILICON SUBSTRATE

BACKGROUND OF THE INVENTION

Field of the Invention

The present invention relates to a method of manufacturing a monocrystalline silicon substrate from a workpiece of monocrystalline silicon that has been manufactured such that a particular crystal plane included in crystal planes {100} is exposed on face and reverse sides thereof.

Description of the Related Art

Semiconductor device chips are typically manufactured from a disk-shaped monocrystalline silicon substrate, hereinafter also referred to as a "substrate." The substrate is sliced from a cylindrical ingot of monocrystalline silicon, hereinafter also referred to as an "ingot," with use of a wire saw (see, for example, Japanese Patent Laid-open No. H09-262826A).

SUMMARY OF THE INVENTION

Saw kerfs that must be taken into account when substrates are sliced from ingots with a wire saw are comparatively large as they are approximately 300 μm wide each. In addition, the sliced substrates leave minute surface irregularities on their surfaces, and are likely to be curved or warped as a whole. Therefore, the surfaces of the sliced substrates need to be lapped, etched, and/or polished to a flat smooth finish.

After an ingot has been sliced into substrates and the substrates have been finished, the amount of monocrystalline silicon that is eventually left in the substrates is approximately ⅔ of the overall amount of monocrystalline silicon of the ingot. In other words, approximately ⅓ of the overall amount of monocrystalline silicon of the ingot turns into sawdust to be disposed of in slicing and planarizing steps. For this reason, the productivity of the process of manufacturing substrates from ingots with use of a wire saw is low.

It is therefore an object of the present invention to provide a method of manufacturing a monocrystalline silicon substrate with high productivity.

In accordance with an aspect of the present invention, there is provided a method of manufacturing a monocrystalline silicon substrate from a workpiece of monocrystalline silicon that has been manufactured such that a particular crystal plane included in crystal planes {100} is exposed on face and reverse sides thereof. The method includes a peel-off layer forming step of moving a focused spot, positioned within the workpiece, of a laser beam that is applied to the workpiece and that has a wavelength transmittable through the monocrystalline silicon and the workpiece relatively to each other along a first direction that is parallel to the particular crystal plane and that is inclined to a particular crystal orientation included in crystal orientations <100> by an angle of 5° or less, thereby forming a peel-off layer in a straight area in the workpiece along the first direction, an indexing-feed step of moving a position where the focused spot of the laser beam is formed and the workpiece relatively to each other along a second direction parallel to the particular crystal plane and perpendicular to the first direction, and a separating step of separating a substrate from the workpiece along peel-off layers in the workpiece that act as separation initiating points, after the peel-off layer forming step and the indexing-feed step have been repeated. The peel-off layer forming step includes a step of moving the focused spot and the workpiece relatively to each other in order to move the focused spot from an inside of the workpiece toward an outside of the workpiece.

According to the present invention, after peel-off layers have been formed in a workpiece of monocrystalline silicon with use of a laser beam having a wavelength transmittable through monocrystalline silicon, a substrate is separated from the workpiece along the peel-off layers acting as separation initiating points. The process results in increased productivity for the manufacture of substrates, compared with a process of manufacturing substrates from a workpiece with use of a wire saw.

The above and other objects, features and advantages of the present invention and the manner of realizing them will become more apparent, and the invention itself will best be understood from a study of the following description and an appended claim with reference to the attached drawings showing a preferred embodiment of the invention.

DETAILED DESCRIPTION OF THE PREFERRED EMBODIMENT

Figure 1:
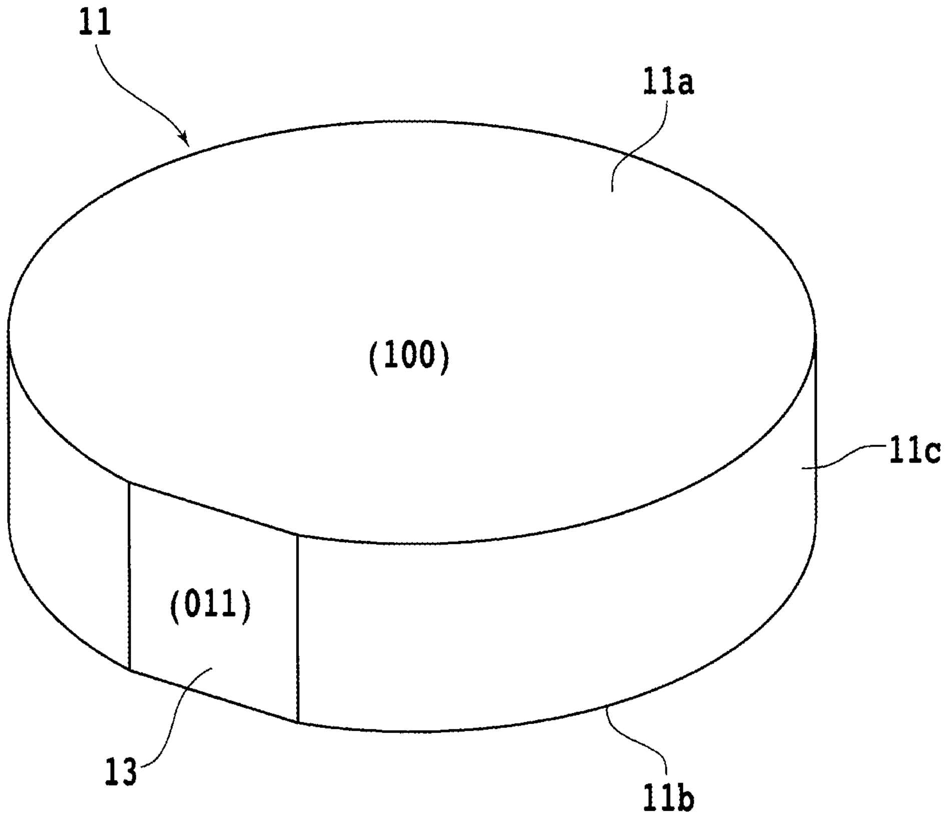
FIG. 1 is a schematic perspective view illustrating an ingot by way of example.
Figure 2:
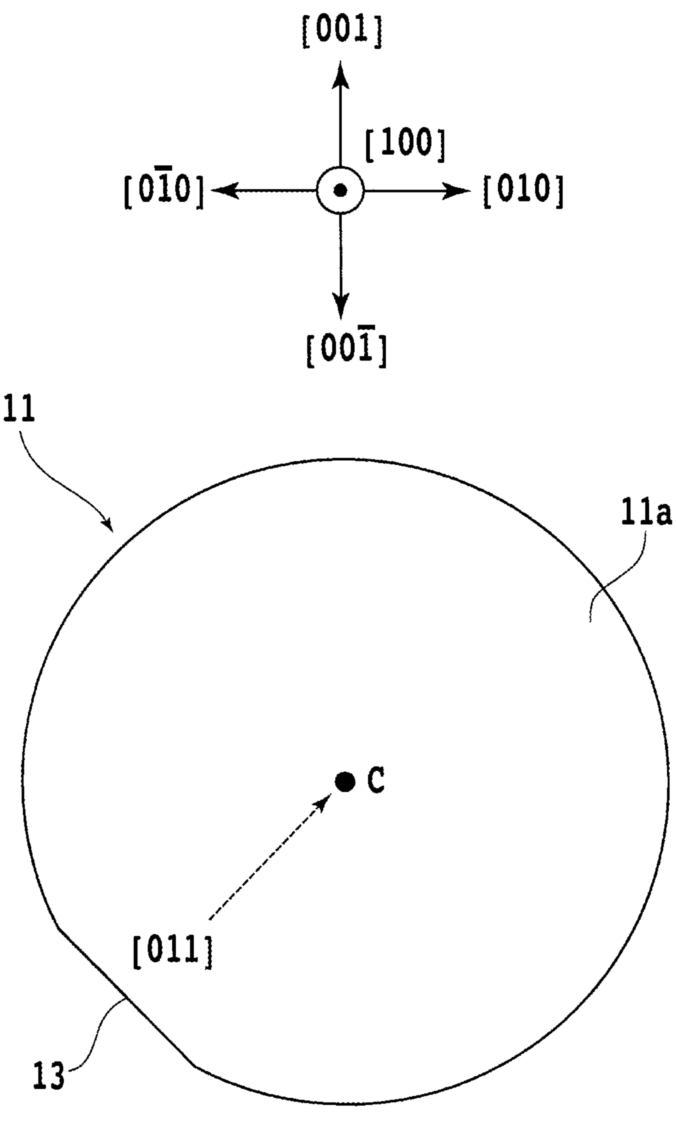
FIG. 2 is a schematic plan view of the ingot illustrated in FIG. 1.

A preferred embodiment of the present invention will be described below with reference to the accompanying drawings. FIG. 1 schematically illustrates in perspective an ingot by way of example, and FIG. 2 schematically illustrates the ingot in plan. FIG. 1 also illustrates crystal planes of monocrystalline silicon that are exposed on flat surfaces of the ingot. FIG. 2 also illustrates a crystal orientation of monocrystalline silicon of the ingot.

The ingot, denoted by 11, illustrated in FIGS. 1 and 2, is shaped as a cylinder of monocrystalline silicon where a particular crystal plane, given herein as a crystal plane (100) for the sake of convenience, included in crystal planes {100} is exposed on each of a face side 11*a* and a reverse side 11*b* of the ingot 11. Stated otherwise, the ingot 11 is shaped as a cylinder of monocrystalline silicon where a line perpendicular to each of the face side 11*a* and the reverse side 11*b*, i.e., a crystal axis of the ingot 11, extends along a crystal orientation [100].

Although the ingot 11 is manufactured such that the crystal plane (100) is exposed on each of the face side 11*a* and the reverse side 11*b*, a plane slightly inclined to the crystal plane (100) may be exposed on each the face side 11*a* and the reverse side 11*b* due to processing errors, etc., that may have occurred in the manufacturing process. Specifically, a plane that is inclined to the crystal plane (100) by an angle of 1° or less may be exposed on each of the face side 11*a* and the reverse side 11*b*. In other words, the crystal axis of the ingot 11 may extend along a direction that is inclined to the crystal orientation [100] by an angle of 1° or less.

The ingot 11 has an orientation flat 13 defined on a side surface 11*c* thereof. The ingot 11 has a center C positioned on a particular crystal orientation, given herein as a crystal orientation [011] for the sake of convenience, included in crystal orientations <110> as viewed from the orientation flat 13. A crystal plane (011) of monocrystalline silicon is exposed on the orientation flat 13.

Figure 3:
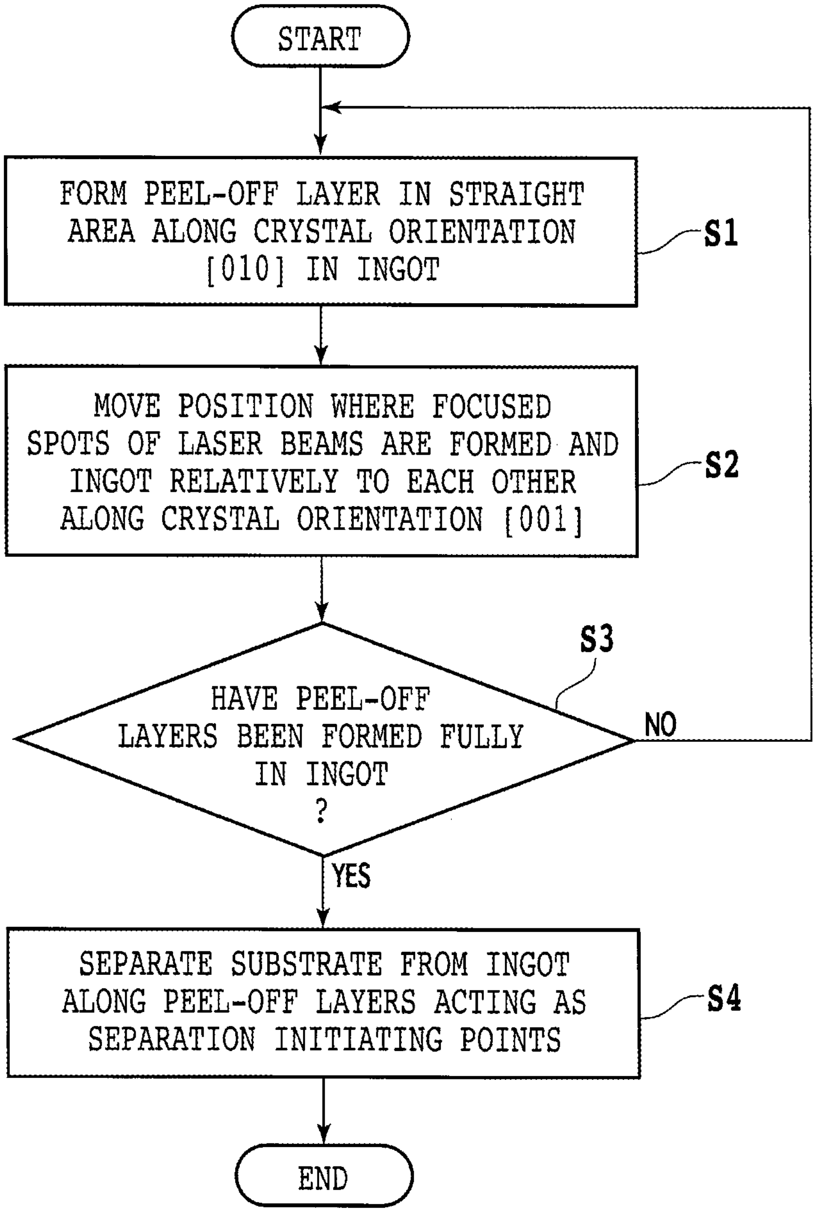
FIG. 3 is a flowchart of a method of manufacturing a monocrystalline silicon substrate according to an embodiment of the present invention.

FIG. 3 is a flowchart of a method of manufacturing a monocrystalline silicon substrate from the ingot 11 as a workpiece according to an embodiment of the present invention. According to the method, simply stated, after peel-off layers have been formed in the ingot 11 fully thereacross by a laser processing apparatus, a substrate is separated from the ingot 11 along the peel-off layers that act as separation initiating points.

Figure 4:
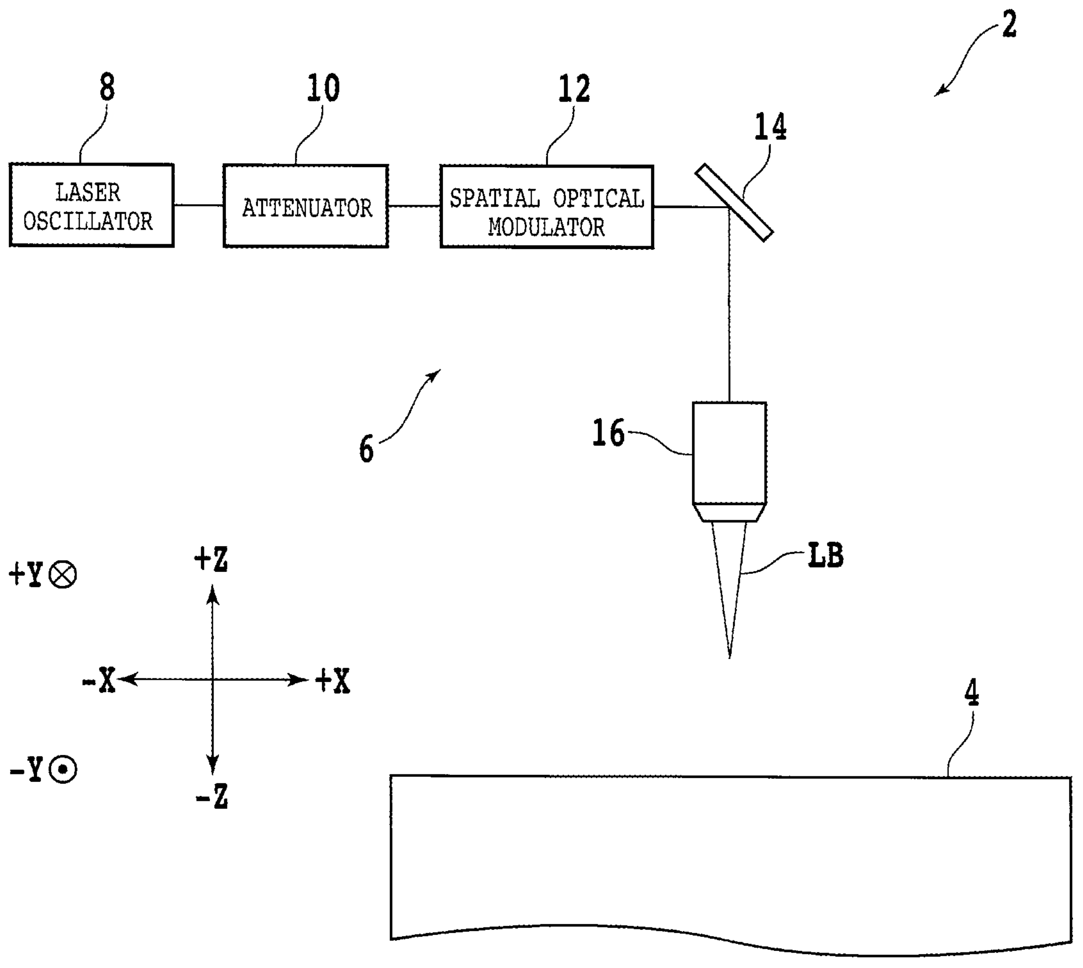
FIG. 4 is a schematic side elevational view, partly in block form, illustrating a laser processing apparatus by way of example.

FIG. 4 schematically illustrates in side elevation, partly in block form, a laser processing apparatus by way of example, the laser processing apparatus being used to form a peel-off layer in the ingot 11. A +X-axis direction and a −X-axis direction illustrated in FIG. 4 extend parallel to each other along an X-axis, and will also collectively be referred to as X-axis directions. A +Y-axis direction and a −Y-axis direction illustrated in FIG. 4 extend parallel to each other along a Y-axis perpendicular to the X-axis, and will also collectively be referred to as Y-axis directions.

The X-axis directions and the Y-axis directions extend perpendicularly to each other on a horizontal plane. A +Z-axis direction and a −Z-axis direction illustrated in FIG. 4 extend parallel to each other along a Z-axis perpendicular to the X-axis and the Y-axis, and will also collectively be referred to as Z-axis directions. The Z-axis directions extend perpendicularly to the X-axis directions and the Y-axis directions. In FIG. 4, some components of the laser processing apparatus are illustrated in block form.

The laser processing apparatus, denoted by 2 in FIG. 4, has a disk-shaped holding table 4. The holding table 4 has a circular upper surface as a holding surface for holding the ingot 11 thereon. The holding surface lies parallel to the X-axis and the Y-axis or the horizontal plane. The holding table 4 includes a disk-shaped porous plate, not illustrated, whose upper surface is exposed on the upper surface of the holding table 4.

The porous plate is fluidly connected to a suction source, not illustrated, such as a vacuum pump, through a fluid channel or the like, not illustrated, defined in the holding table 4. When the suction source is actuated, it generates a negative pressure through the fluid channel to a space in the vicinity of the holding surface of the holding table 4, thereby holding the ingot 11 under suction on the holding surface.

The laser processing apparatus 2 also has a laser beam applying unit 6 disposed above the holding table 4. The laser beam applying unit 6 includes a laser oscillator 8 that has a laser medium of neodymium-doped yttrium aluminum garnet (Nd:YAG) or the like and that emits a pulsed laser beam LB having a wavelength of 1064 nm, for example, transmittable through monocrystalline silicon.

The laser beam LB has its output power level adjusted by an attenuator 10 and is then applied to a spatial optical modulator 12. The spatial optical modulator 12 branches the adjusted laser beam LB into a plurality of laser beams LB. Specifically, the spatial optical modulator 12 branches the adjusted laser beam LB into a plurality of, e.g., five, laser beams LB that will have respective focused spots in the ingot 11 arrayed at equal intervals along the Y-axis after being emitted from an emission head 16 to be described below.

The laser beams LB emitted from the spatial optical modulator 12 are applied to and reflected by a mirror 14 to travel to the emission head 16. The emission head 16 houses therein a condensing lens, not illustrated, for converging the laser beams LB. The laser beams LB converged by the condensing lens are emitted toward the holding surface of the holding table 4.

The emission head 16 of the laser beam applying unit 6 is coupled to a moving mechanism, not illustrated. The moving mechanism includes ball screws, etc., and moves the emission head 16 in the X-axis directions, the Y-axis directions, and/or the Z-axis directions. The moving mechanism is actuated to adjust the positions or coordinates of the focused spots of the laser beams LB emitted from the emission head 16 in the X-axis directions, the Y-axis directions, and/or the Z-axis directions.

Figure 5A:
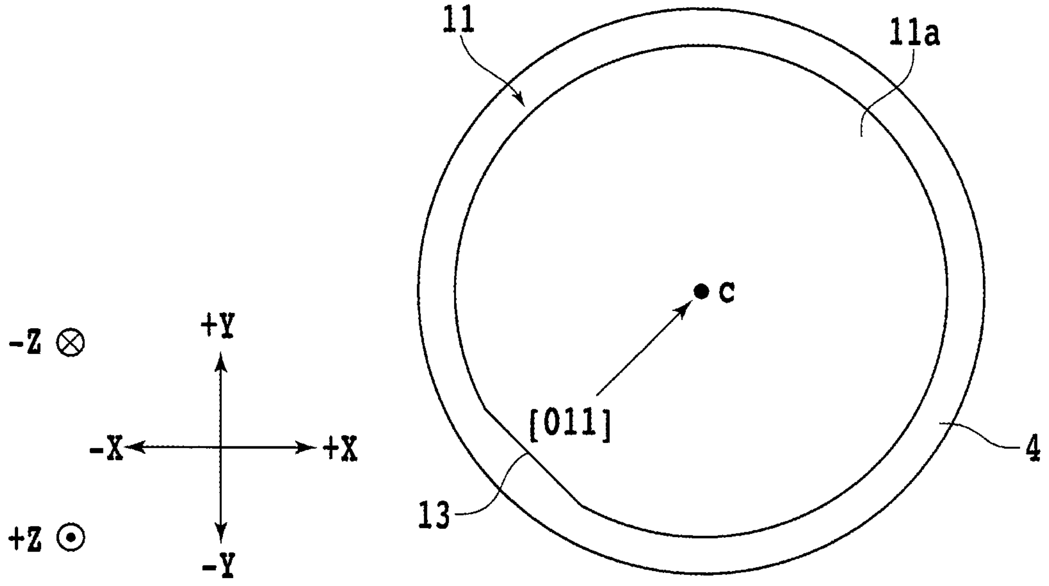
FIG. 5A is a schematic plan view of a holding table, of the laser processing apparatus, for holding an ingot thereon.

For forming a peel-off layer in the ingot 11 fully thereacross on the laser processing apparatus 2, the ingot 11 with its face side 11*a* facing upwardly is placed and held on the holding table 4. FIG. 5A schematically illustrates in plan the holding table 4 with the ingot 11 held thereon.

The ingot 11 is held on the holding table 4 such that the direction from the orientation flat 13 toward the center C of the ingot 11, i.e., the crystal orientation [011], is inclined to the +X-axis direction and the +Y-axis direction by an angle of 45°. For example, the ingot 11 is held on the holding table 4 such that the ingot 11 has a crystal orientation [010] directed along the +X-axis direction and a crystal orientation [001] directed along the +Y-axis direction.

Then, in order to form a peel-off layer in a straight area, in the ingot 11, that extends along the X-axis at an end of the ingot 11 along the Y-axis, i.e., in the −Y-axis direction, the moving mechanism moves the emission head 16 to a position where the laser beams LB start being applied to the ingot 11, i.e., a first emission starting position. The first emission starting position is a position where, when the laser beams LB are emitted from the emission head 16 to the ingot 11, they form their respective focused spots in the ingot 11 radially inwardly of the side surface 11*c* thereof, i.e., a position closer to the center C than the side surface 11*c*.

Figure 5B:
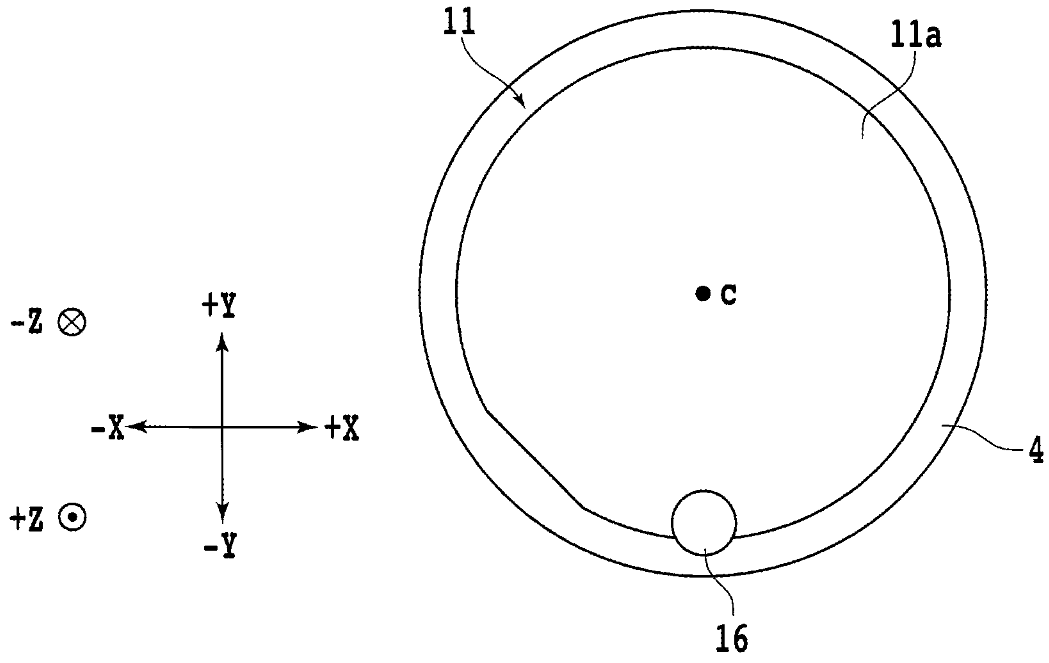
FIG. 5B is a schematic plan view illustrating an emission head that is positioned in a first emission starting position.

FIG. 5B schematically illustrates in plan the emission head 16 that is positioned in the first emission starting position. The emission head 16 positioned in the first emission starting position has its center positioned slightly radially inwardly of the side surface 11*c* of the ingot 11, for example. The center C of the ingot 11 is spaced in the +Y-axis direction, i.e., the crystal orientation [001], from the center of the emission head 16 in the first emission starting position, as viewed in plan.

Then, a peel-off layer is formed in the straight area, in the ingot 11, that extends along the +X-axis direction along the crystal orientation [010] (peel-off layer forming step S1). In the peel-off layer forming step S1, the laser beams LB are applied to the ingot 11 with their focused spots positioned in the ingot 11 while the emission head 16 is being moved in the −X-axis direction.

Figure 6A:
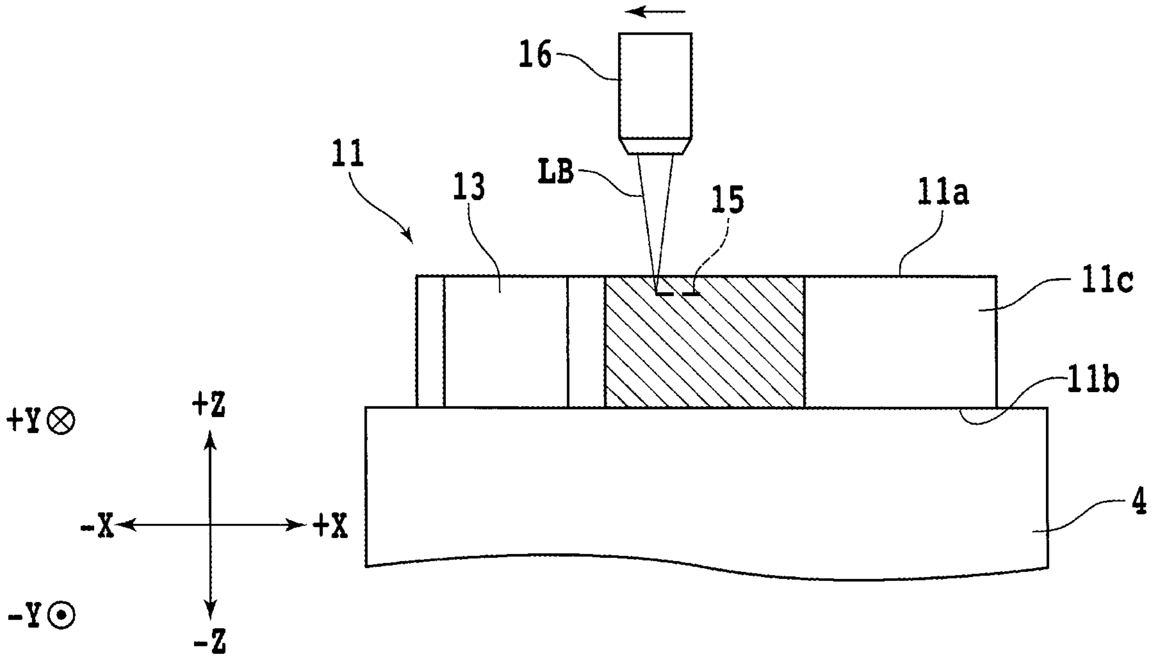
FIG. 6A is a schematic side elevational view, partly in cross section, illustrating a cross-sectional area, of an ingot, that extends parallel to an X-axis and a Z-axis and that is irradiated with laser beams emitted from the emission head as it moves in a −X-axis direction from the first emission starting position.
Figure 6B:
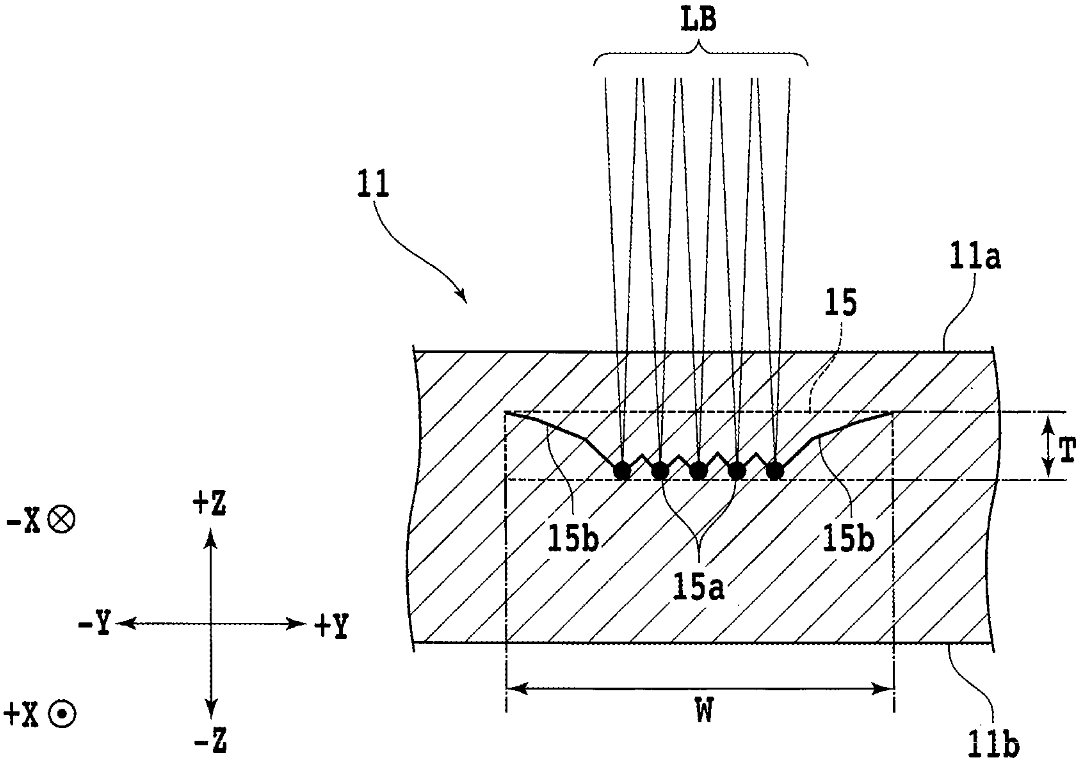
FIG. 6B is an enlarged schematic cross-sectional view illustrating a cross-sectional area, of the ingot, that extends parallel to the Y-axis and the Z-axis and that is irradiated with the laser beams emitted from the emission head as it moves in the −X-axis direction from the first emission starting position.

As described above, the laser beams LB that have been branched by the spatial optical modulator 12 have their focused spots, i.e., five focused spots, arrayed at equal intervals along the Y-axis. FIG. 6A schematically illustrates in side elevation, partly in cross section, a cross-sectional area, of the ingot 11, that extends parallel to the X-axis and the Z-axis and that is irradiated with the laser beams LB emitted from the emission head 16 as it moves in the −X-axis direction from the first emission starting position. FIG. 6B schematically illustrates in enlarged cross section a cross-sectional area, of the ingot 11, that extends parallel to the Y-axis and the Z-axis and that is irradiated with the laser beams LB emitted from the emission head 16 as it moves in the −X-axis direction from the first emission starting position.

The laser beams LB thus applied to the ingot 11 form modified regions 15*a* where the crystalline structure of monocrystalline silicon is disrupted respectively around the focused spots in the ingot 11. The modified regions 15*a* are arrayed along the Y-axis.

At this time, cracks 15*b* are developed along predetermined crystal planes from the respective modified regions 15*a*. The modified regions 15*a* and the cracks 15*b* developed therefrom jointly make up a peel-off layer 15 in the ingot 11.

In general, monocrystalline silicon is most likely to cleave along a particular crystal plane included in crystal planes {111}, and is second most likely to cleave along a particular crystal plane included in crystal planes {110}. Therefore, when modified regions are formed along a particular crystal orientation, e.g., a crystal orientation [011], included in crystal orientations <110> of monocrystalline silicon of an ingot, for example, many cracks are developed from the modified regions along the particular crystal plane included in the crystal planes {111}.

On the other hand, when a plurality of modified regions are formed in a straight area along a particular crystal orientation included in crystal orientations <100> of monocrystalline silicon such that the modified regions are arrayed along a direction perpendicular to the direction in which the straight area extends, as viewed in plan, many cracks are developed from the modified regions along a crystal plane parallel to the direction in which the straight area extends, among crystal planes {N10} (N represents a natural number of 10 or less).

For example, when the modified regions 15*a* arrayed along the crystal orientation [001], i.e., the +Y-axis direction, are formed in the straight area along the crystal orientation [010], i.e., the +X-axis direction, many cracks are developed from the modified regions 15*a* along a crystal plane parallel to the crystal orientation [010] among the crystal planes {N10} (N represents a natural number 10 or less).

Specifically, when the modified regions 15*a* are thus formed, cracks are likely to develop along the following crystal planes.

$$(101),(201),(301),(401),(501),(601),(701),(801),(901),(\underline{10}01) \quad \text{[Math. 1]}$$

$$(\bar{1}01),(\bar{2}01),(\bar{3}01),(\bar{4}01),(\bar{5}01),(\bar{6}01),(\bar{7}01),(\bar{8}01),(\bar{9}01),(\overline{\underline{10}}01) \quad \text{[Math. 2]}$$

The angle that the crystal plane (100) exposed on the face side 11*a* and the reverse side 11*b* of the ingot 11 forms with the crystal plane parallel to the crystal orientation [010] among the crystal planes {N10} is 45° or less. On the other hand, the angle that the crystal plane (100) forms with the particular crystal plane included in the crystal planes {111} is approximately 54.7°.

Therefore, when the laser beams LB are applied to the ingot 11 along the crystal orientation [010] (former case), the peel-off layer 15 tends to be wider and thinner than when the laser beams LB are applied to the ingot 11 along the crystal orientation [011] (latter case). In other words, the value (W/T) of the ratio of the width (W) to the thickness (T) of the peel-off layer 15 illustrated in FIG. 6B is larger with the former case than with the latter case.

Further, the laser beams LB are applied to the ingot 11 while the emission head 16 is being moved in the −X-axis direction until the emission head 16 reaches a position where the laser beams LB finish being applied from the emission head 16 to the ingot 11, i.e., a first emission ending position. The first emission ending position is a position where, when the laser beams LB are emitted from the emission head 16 to the ingot 11, they form their respective focused spots radially outwardly of the side surface 11*c* of the ingot 11.

Figure 7A:
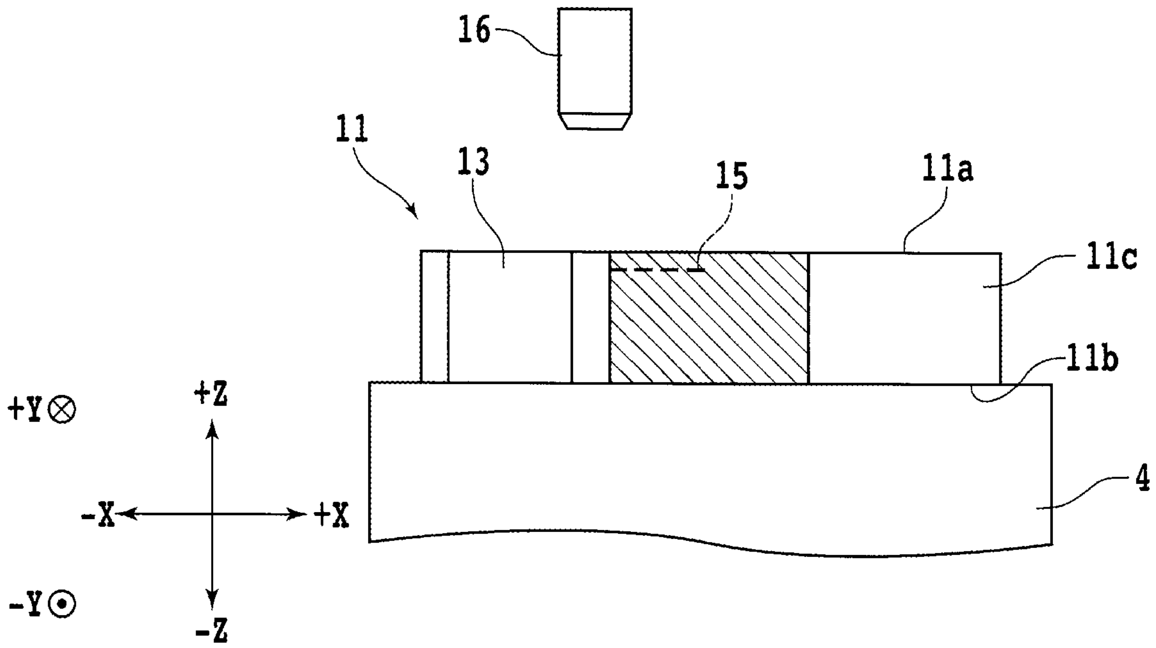
FIG. 7A is a schematic side elevational view, partly in cross section, illustrating the emission head that is positioned in a first emission ending position.

FIG. 7A schematically illustrates in side elevation, partly in cross section, the emission head 16 that is positioned in the first emission ending position. The emission head 16 positioned in the first emission ending position has its center positioned slightly radially outwardly of the side surface 11*c* of the ingot 11, as viewed in plan. The first emission starting position is spaced from the first emission ending position in the +X-axis direction.

When the laser beams LB are applied to an area of the ingot 11 in the vicinity of the side surface 11*c* thereof, the power of the laser beams LB becomes unstable at their focused spots. In this case, the positions of the focused spots of the laser beams LB that have passed through the face side 11*a* of the ingot 11 and the positions of the focused spots of the laser beams LB that have passed through the side surface 11*c* of the ingot 11 deviate from each other due to the difference between the refractive index of the ingot 11 and the refractive index of the atmosphere.

In other words, the focused spots of the laser beams LB emitted from the emission head 16 are not fixed in position. Consequently, modified regions 15*a* may not sufficiently be formed in the area of the ingot 11 in the vicinity of the side surface 11*c* thereof. If modified regions 15*a* are not formed, then cracks 15*b* are not developed in the ingot 11. As a result, no peel-off layer 15 may possibly be formed in the area of the ingot 11 in the vicinity of the side surface 11*c* thereof.

On the other hand, providing that cracks 15*b* have been formed radially inwardly of the area of the ingot 11 in the vicinity of the side surface 11*c* thereof, cracks 15*b* tend to be developed toward the side surface 11*c* in order to release stresses that have been produced in the ingot 11 due to the cracks 15*b* formed therein. Therefore, it is preferable to apply the laser beams LB to the area of the ingot 11 with the cracks 15*b* having been formed radially inwardly of the area.

Specifically, the laser beams LB should preferably be applied to the ingot 11 while the focused spots thereof are being moved from the inside of the ingot 11 toward the outside of the ingot 11. The laser beams LB thus applied make it easier to form a peel-off layer 15 in the area of the ingot 11 in the vicinity of the side surface 11*c* thereof than when the laser beams LB are applied to the ingot 11 while the focused spots thereof are being moved from the outside of the ingot 11 toward the inside of the ingot 11.

Figure 7B:
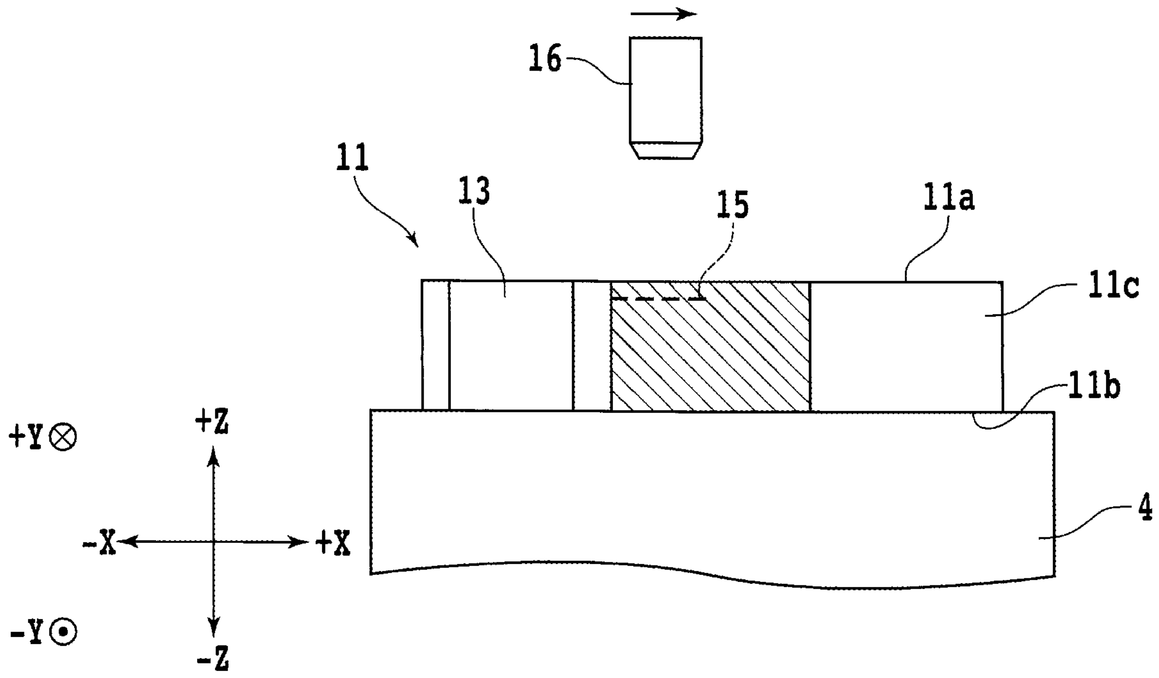
FIG. 7B is an enlarged side elevational view, partly in cross section, illustrating the emission head that is returning to the first emission starting position.

Then, the emission head 16 is moved in the +X-axis direction back to the first emission starting position. FIG. 7B schematically illustrates in side elevation, partly in cross section, the emission head 16 that is returning to the first emission starting position. At this time, the emission head 16 may return to the first emission starting position while applying the laser beams LB to the ingot 11 to increase the density of the modified regions 15*a* and the cracks 15*b* contained in the peel-off layer 15 that has already been formed in the ingot 11.

Figure 8A:
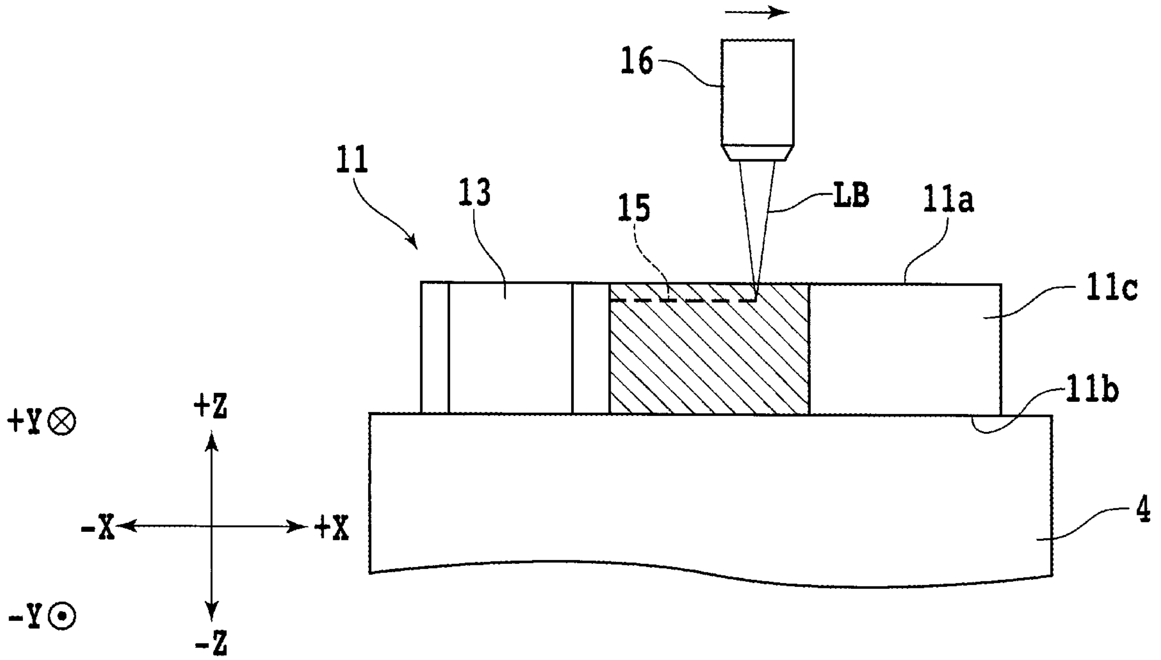
FIG. 8A is a schematic side elevational view, partly in cross section, illustrating the cross-sectional area, of the ingot, that extends parallel to the X-axis and the Z-axis and that is irradiated with the laser beams emitted from the emission head as it moves in a +X-axis direction from the first emission starting position.

Then, the laser beams LB are applied to the ingot 11 while the emission head 16 is being moved in the +X-axis direction. FIG. 8A schematically illustrates in side elevation, partly in cross section, the cross-sectional area, of the ingot 11, that extends parallel to the X-axis and the Z-axis and that is irradiated with the laser beams LB emitted from the emission head 16 as it moves in the +X-axis direction from the first emission starting position. The laser beams LB thus applied form a new peel-off layer 15, in the ingot 11, that extends in the +X-axis direction from the peel-off layer 15 already formed in the ingot 11.

The area, of the ingot 11, that is irradiated with the laser beams LB upon movement of the emission head 16 in the +X-axis direction may overlap the area of the ingot 11 in which area the peel-off layer 15 has already been formed. Specifically, the emission head 16 may be moved back to a position that is slightly spaced from the first emission starting position in the −X-axis direction, and the laser beams LB may be applied to the ingot 11 while the emission head 16 is being moved in the +X-axis direction from the spaced position.

The laser beams LB are applied to the ingot 11 while the emission head 16 is being moved in the +X-axis direction until the emission head 16 reaches a position where the laser beams LB finish being applied from the emission head 16 to the ingot 11, i.e., a second emission ending position. The second emission ending position is a position where, when the laser beams LB are emitted from the emission head 16 to the ingot 11, they form their respective focused spots radially outwardly of the side surface 11*c* of the ingot 11.

Figure 8B:
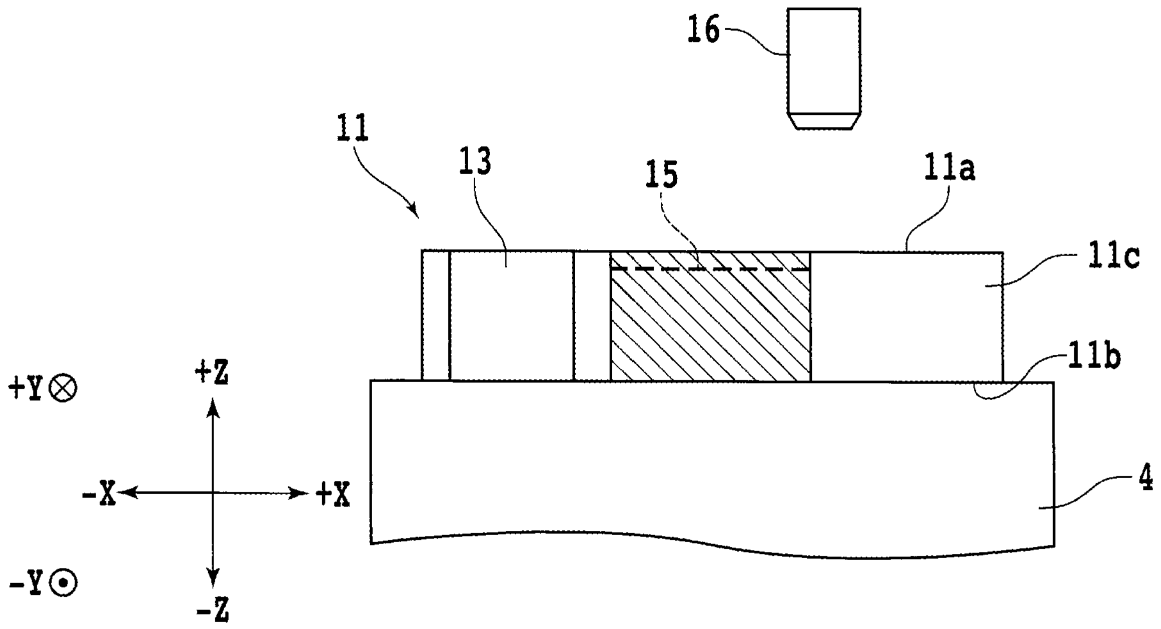
FIG. 8B is a schematic side elevational view, partly in cross section, illustrating the emission head that is positioned in a second emission ending position.

FIG. 8B schematically illustrates in side elevation, partly in cross section, the emission head 16 that is positioned in the second emission ending position. The emission head 16 positioned in the second emission ending position has its center positioned slightly radially outwardly of the side surface 11*c* of the ingot 11 and spaced from the first emission ending position in the +X-axis direction, as viewed in plan. The laser beams LB thus applied to the ingot 11 so far form the peel-off layer 15 in the straight area, in the ingot 11, that extends along the +X-axis direction, i.e., the crystal orientation [010].

Then, the position where the focused spots of the laser beams LB are formed in the ingot 11 and the ingot 11 are relatively moved in the +Y-axis direction, i.e., the crystal orientation [001] (indexing-feed step S2). In the indexing-feed step S2, the moving mechanism moves the emission head 16 to a position where the laser beams LB start being applied to the ingot 11, i.e., a second emission starting position, in order to form a peel-off layer 15 in a straight area, in the ingot 11, that lies parallel to the straight area in which the peel-off layer 15 has already been formed.

Figure 9A:
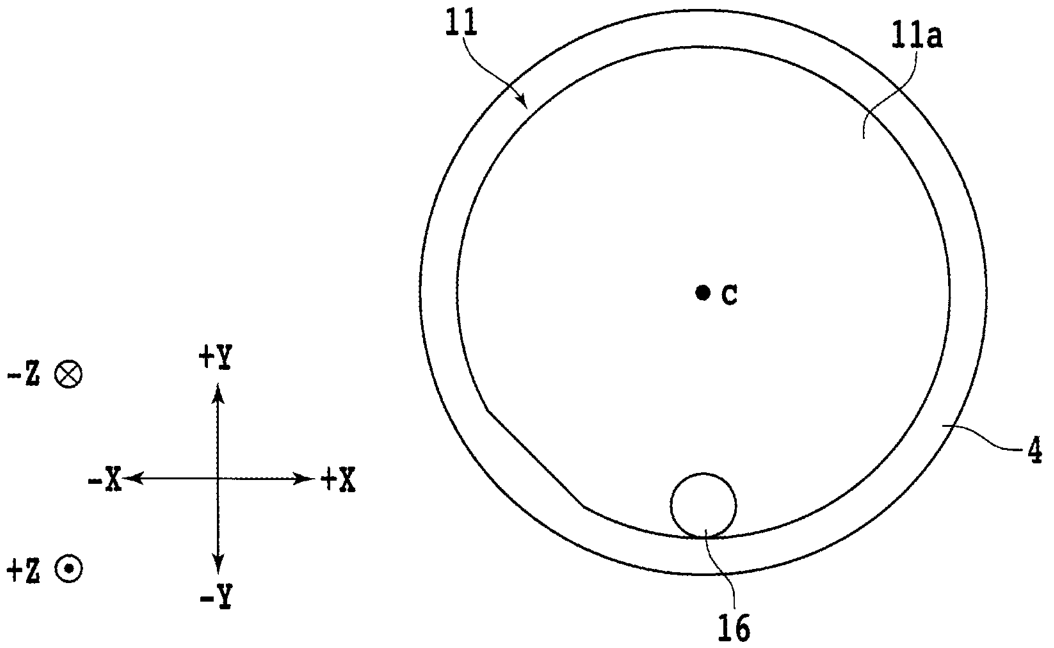
FIG. 9A is a schematic plan view illustrating the emission head that is positioned in a second emission starting position.

FIG. 9A schematically illustrates in plan the emission head 16 that is positioned in the second emission starting position. In the indexing-feed step S2, the moving mechanism moves the emission head 16 in the −X-axis direction until the emission head 16 returns to the first emission starting position and thereafter moves the emission head 16 in the +Y-axis direction until the emission head 16 reaches the second emission starting position.

When the emission head 16 returns to the first emission starting position, the emission head 16 may apply the laser beams LB to the ingot 11 to increase the density of the modified regions 15*a* and the cracks 15*b* contained in the peel-off layer 15 that has already been formed in the ingot 11.

The indexed distance that the emission head 16 repeatedly moves along the Y-axis is set to a value equal to or larger than the width (W) of the peel-off layer 15, for example. Specifically, if the width (W) of the peel-off layer 15 is in the range of 250 to 280 μm, then the index distance is set to approximately 530 μm.

Then, the peel-off layer forming step S1 is carried out again. Specifically, the laser beams LB are applied to the ingot 11 with their focused spots positioned in the ingot 11 while the emission head 16 is being moved in the −X-axis direction.

Figure 9B:
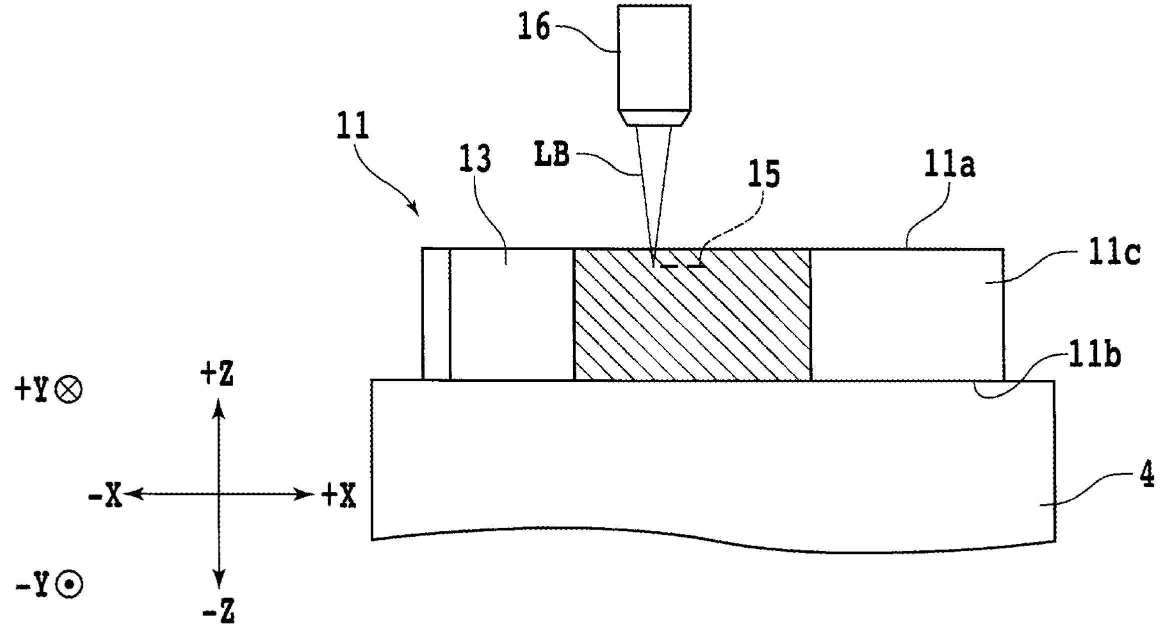
FIG. 9B is a schematic side elevational view, partly in cross section, illustrating a cross-sectional area, of the ingot, that extends parallel to the X-axis and the Z-axis and that is irradiated with the laser beams emitted from the emission head as it moves in the −X-axis direction from the second emission starting position.
Figure 10A:
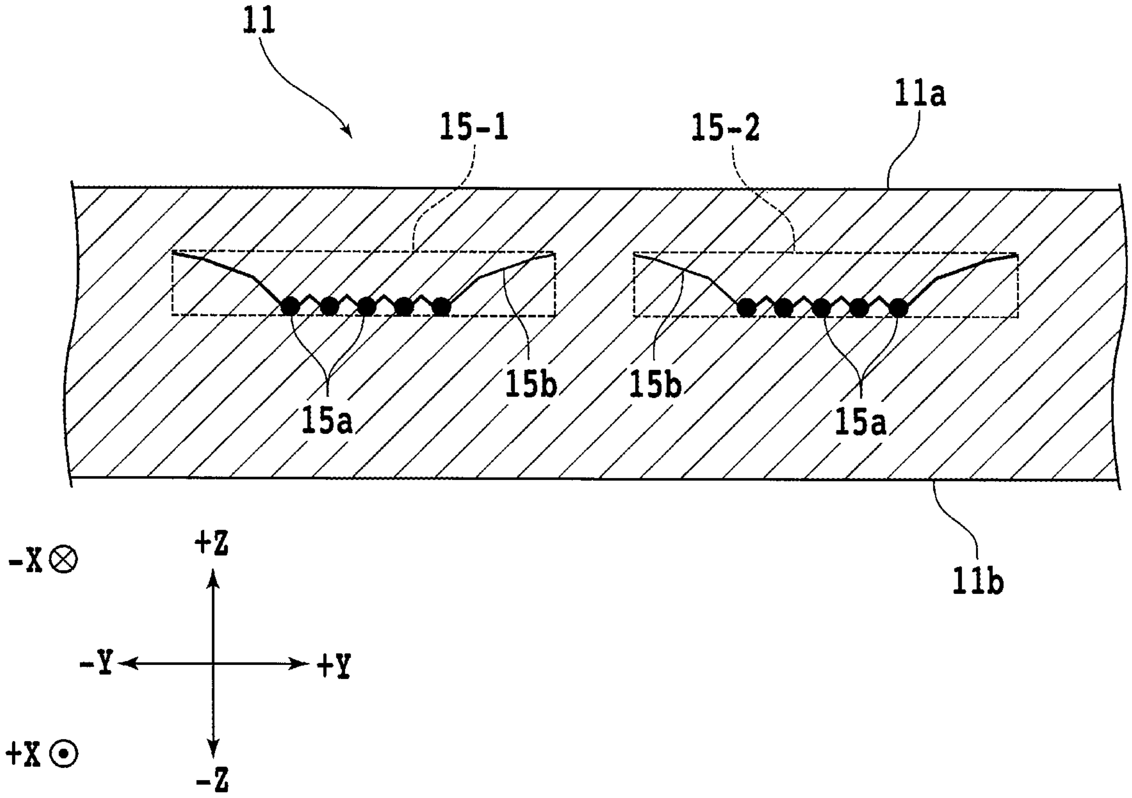
FIG. 10A is a schematic enlarged cross-sectional view illustrating a cross-sectional area, of the ingot, that extends parallel to the Y-axis and the Z-axis and that has been irradiated with the laser beams emitted from the emission head as it moves in the −X-axis direction from the second emission starting position.

FIG. 9B schematically illustrates in side elevation, partly in cross section, a cross-sectional area, of the ingot 11, that extends parallel to the X-axis and the Z-axis and that is irradiated with the laser beams LB emitted from the emission head 16 as it moves in the −X-axis direction from the second emission starting position. FIG. 10A schematically illustrates in enlarged cross section a cross-sectional area, of the ingot 11, that extends parallel to the Y-axis and the Z-axis and that has been irradiated with the laser beams LB emitted from the emission head 16 as it moves in the −X-axis direction from the second emission starting position. The laser beams LB thus applied to the ingot 11 form, in the ingot 11, a peel-off layer 15, i.e., 15-2, that extends parallel to the peel-off layer 15, i.e., 15-1, already formed in the ingot 11 and that is spaced from the peel-off layer 15-1 along the Y-axis.

Further, the laser beams LB are applied to the ingot 11 while the emission head 16 is being moved in the −X-axis direction until the emission head 16 reaches a position where the laser beams LB finish being applied from the emission head 16 to the ingot 11, i.e., a third emission ending position. The third emission ending position is a position where, when the laser beams LB are emitted from the emission head 16 to the ingot 11, they form their respective focused spots slightly radially outwardly of the side surface 11*c* of the ingot 11.

Then, the emission head 16 is moved in the +X-axis direction back to the second emission starting position. At this time, the emission head 16 may return to the second emission starting position while applying the laser beams LB to the ingot 11 to increase the density of the modified regions 15*a* and the cracks 15*b* contained in the peel-off layer 15, i.e., 15-2, that has already been formed in the ingot 11.

Then, the laser beams LB are applied to the ingot 11 while the emission head 16 is being moved in the +X-axis direction. The laser beams LB thus applied form a new peel-off layer 15, e.g., 15-2, in the ingot 11, that extends in the +X-axis direction from the peel-off layer 15, i.e., 15-2, already formed in the ingot 11.

The area, of the ingot 11, that is irradiated with the laser beams LB upon movement of the emission head 16 in the +X-axis direction may overlap the area of the ingot 11 in which area the peel-off layer 15, i.e., 15-2, has already been formed. Specifically, the emission head 16 may be moved back to a position that is slightly spaced from the second emission starting position in the −X-axis direction, and the laser beams LB may be applied to the ingot 11 while the emission head 16 is being moved in the +X-axis direction from the spaced position.

Further, the laser beams LB are applied to the ingot 11 while the emission head 16 is being moved in the +X-axis direction until the emission head 16 reaches a position where the laser beams LB finish being applied from the emission head 16 to the ingot 11, i.e., a fourth emission ending position. The fourth emission ending position is a position where, when the laser beams LB are emitted from the emission head 16 to the ingot 11, they form their respective focused spots radially outwardly of the side surface 11*c* of the ingot 11.

Figure 10B:
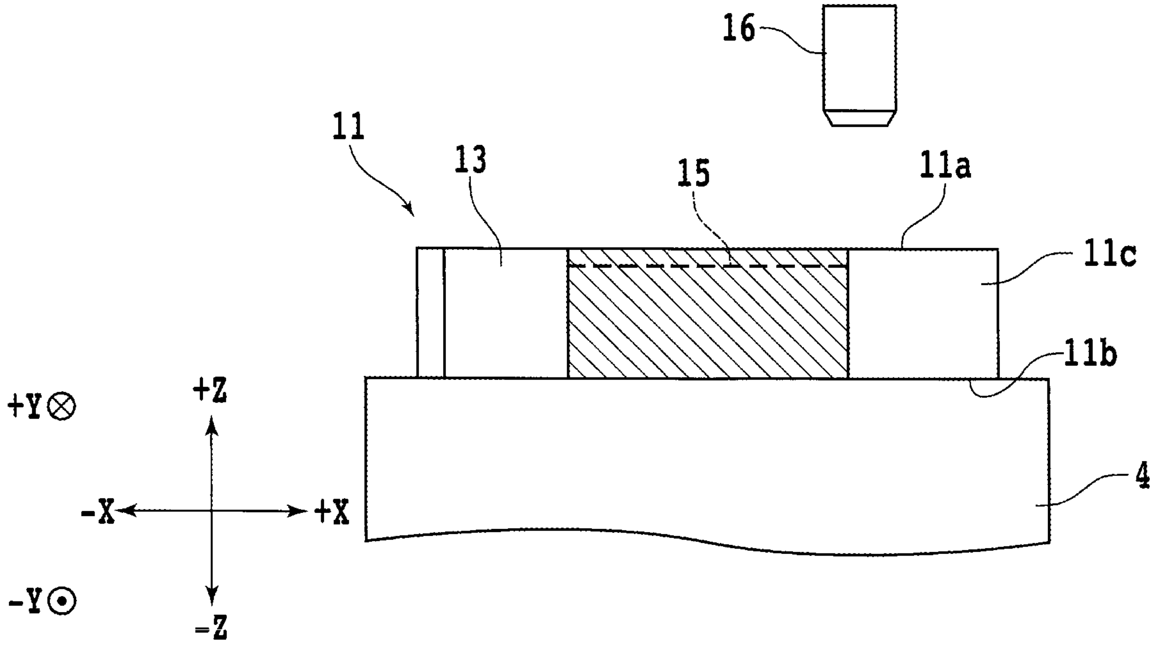
FIG. 10B is a schematic side elevational view, partly in cross section, illustrating the emission head that is positioned in a fourth emission ending position.

FIG. 10B schematically illustrates in side elevation, partly in cross section, the emission head 16 that is positioned in the fourth emission ending position. The emission head 16 positioned in the fourth emission ending position has its center positioned slightly radially outwardly of the side surface 11*c* of the ingot 11 and spaced from the third emission ending position in the +X-axis direction, as viewed in plan.

The laser beams LB thus applied to the ingot 11 so far form the peel-off layer 15, i.e., 15-2, in the straight area, in the ingot 11, that extends along the X-axis direction, i.e., the crystal orientation.

The peel-off layer 15-2 is closer to the center C of the ingot 11 than the initially formed peel-off layer 15-1 is and is longer than the peel-off layer 15-1 along the X-axis.

The indexing-feed step S2 and the peel-off layer forming step S1 are repeatedly carried out until a peel-off layer 15 is formed in a straight area, in the ingot 11, that extends along the X-axis at an opposite end of the ingot 11 along the Y-axis. If peel-off layers 15 have been formed fully in the ingot 11 from the area at the end in the −Y-axis direction of the ingot 11 to the area at the opposite end in the +Y-axis direction of the ingot 11 (step S3: YES), then a substrate is separated from the ingot 11 along the peel-off layers 15 that act as separation initiating points (separating step S4).

Figure 11A:
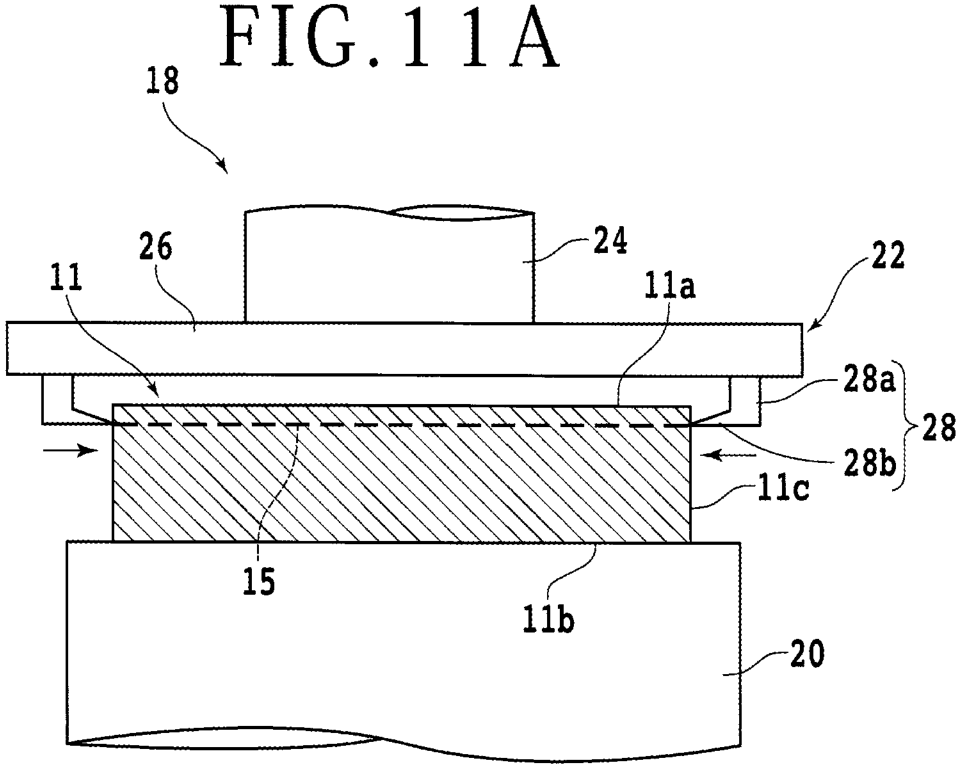
FIG. 11A is a schematic side elevational view, partly in cross section, illustrating an example of the manner in which a substrate is separated from the ingot.
Figure 11B:
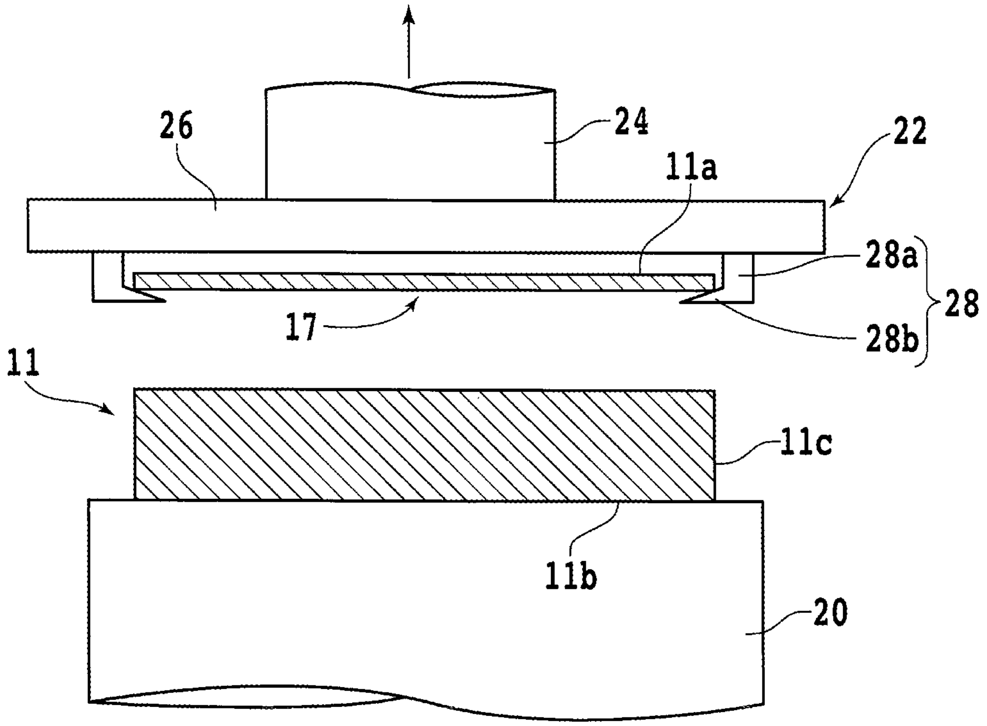
FIG. 11B is a schematic side elevational view, partly in cross section, illustrating the example of the manner in which the substrate is separated from the ingot.

FIGS. 11A and 11B schematically illustrate, in side elevation, partly in cross section, an example of the manner in which a substrate is separated from the ingot 11 in the separating step S4. The separating step S4 is carried out by a separating apparatus 18 illustrated in FIGS. 11A and 11B. As illustrated in FIGS. 11A and 11B, the separating apparatus 18 has a holding table 20 for holding thereon the ingot 11 with the peel-off layers 15 formed therein.

The holding table 20 has a circular upper surface as a holding surface where a porous plate, not illustrated, is exposed. The porous plate is fluidly connected to a suction source, not illustrated, such as a vacuum pump, through a fluid channel or the like, not illustrated, defined in the holding table 20. When the suction source is actuated, it generates a negative pressure through the fluid channel to a space in the vicinity of the holding surface of the holding table 20, thereby holding the ingot 11 under suction on the holding surface.

A separating unit 22 is disposed above the holding table 20. The separating unit 22 has a cylindrical support member 24 having an upper portion to which there are coupled a ball-screw-type lifting and lowering mechanism, not illustrated, and a rotary actuator, not illustrated, such as an electric motor, for example. When the ball-screw-type lifting and lowering mechanism is actuated, it selectively lifts and lowers the separating unit 22. When the rotary actuator is actuated, it rotates the support member 24 about a straight rotational axis passing through the center of the support member 24 and extending perpendicularly to the holding surface of the holding table 20.

The support member 24 has a lower end fixed centrally to an upper portion of a disk-shaped base 26. A plurality of movable fingers 28 are mounted on a lower surface of an outer circumferential portion of the base 26 and angularly spaced at generally equal intervals circumferentially around the base 26. The movable fingers 28 have respective plate-shaped vertical portions 28*a* extending downwardly from the lower surface of the base 26.

The vertical portions 28*a* have respective upper ends coupled to actuators such as air cylinders, not illustrated, housed in the base 26. When the actuators are actuated, they move the movable fingers 28 in radial directions of the base 26. The movable fingers 28 also include respective plate-shaped wedges 28*b* extending radially inwardly from respectively inner sides of a lower end portion of the vertical portions 28*a*. The wedges 28*b* are tapered in such a manner as to be progressively thinner toward their pointed distal ends.

The separating apparatus 18 operates to carry out the separating step S4 according to the following sequence of events. First, the ingot 11 is placed on the holding table 20 such that the center of the reverse side 1*b* of the ingot 11 with the peel-off layers 15 formed therein and the center of the holding surface of the holding table 20 are aligned with each other.

Then, the suction source fluidly connected to the porous plate exposed on the holding surface is actuated to hold the ingot 11 under suction on the holding table 20. Thereafter, the actuators coupled to the movable members 28 is actuated to position the movable members 28 on a radially outer portion of the base 26.

Next, the lifting and lowering mechanism is operated to position the pointed distal ends of the wedges 28*b* of the respective movable members 28 at a height horizontally aligned with the peel-off layers 15 in the ingot 11. Then, the actuators are operated to drive the wedges 28*b* into the side surface 11*c* of the ingot 11 (see FIG. 11A). Thereafter, the rotary actuator is operated to rotate the wedges 28*b* driven in the side surface 11*c* of the ingot 11.

Then, the lifting and lowering mechanism is operated to lift the wedges 28*b* (see FIG. 11B). When the wedges 28*b* are thus lifted after being driven into the side surface 11*c* of the ingot 11 and rotated, the cracks 18*b* contained in the peel-off layers 15 are further developed. As a result, a portion of the ingot 11 closer to the face side 11*a* of the ingot 11 and a remaining portion of the ingot 11 closer to the reverse side 11*b* of the ingot 11 are separated from each other along the peel-off layers 15 that act as separation initiating points. The separated portion of the ingot 11 closer to the face side 11*a* is now manufactured as a substrate 17 from the ingot 11.

If the portion of the ingot 11 closer to the face side 11*a* of the ingot 11 and the remaining portion of the ingot 11 closer to the reverse side 11*b* of the ingot 11 are separated from each other at the time when the wedges 28*b* are driven into the side surface 11*c* of the ingot 11, then the wedges 28*b* may not be rotated. The actuators and the rotary actuator may be operated simultaneously to drive the rotating wedges 28*b* into the side surface 11*c* of the ingot 11.

In the method of manufacturing the monocrystalline silicon substrate 17 from the ingot 11 according to the present embodiment, after peel-off layers 15 have been formed in the ingot 11 by the laser beams LB whose wavelength is transmittable through monocrystalline silicon, the substrate 17 is separated from the ingot 11 along the peel-off layers 15 that act as separation initiating points. The method is effective to reduce the amount of monocrystalline silicon to be disposed of in the manufacture of the substrate 17 from the ingot 11, resulting in increased productivity for the manufacture of the substrate 17, compared with a process of manufacturing the substrate 17 from the ingot 11 with use of a wire saw.

In the method described above, a plurality of modified regions 15*a* are formed in an array along the crystal orientation [001], i.e., the +Y-axis direction, in a straight area along the crystal orientation [010], i.e., the +X-axis direction. In this case, many cracks are developed from the respective modified regions 15*a* along a crystal plane parallel to the crystal orientation [010] among crystal planes {N10} (N represents a natural number 10 or less).

According to the method described above, therefore, the peel-off layer 15 tends to be wider and thinner than when the laser beams LB are applied to the ingot 11 along the crystal orientation [011]. As a result, it is possible to further reduce the amount of monocrystalline silicon to be disposed of in the manufacture of the substrate 17 from the ingot 11, resulting in increased productivity for the manufacture of the substrate 17.

In the method described above, further, the peel-off layer 15 is formed in the ingot 11 by moving the focused spots of the laser beams LB from the inside of the ingot 11 toward the outside of the ingot 11. According to the method described above, therefore, the peel-off layer 15 is formed to a sufficient extent in the area of the ingot 11 in the vicinity of the side surface 11*c*. As a result, it is easy to separate the substrate 17 from the ingot 11 in the separating step S4.

The method of manufacturing a monocrystalline silicon substrate as described above represents an aspect of the present invention, and the present invention is not limited to the above described method. An ingot used to manufacture a substrate according to the present invention is not limited to the ingot 11 illustrated in FIGS. 1, 2, etc.

Specifically, according to the present invention, a substrate may be manufactured from an ingot having a notch defined in a side surface thereof. Alternatively, according to the present invention, a substrate may be manufactured from an ingot that is free of an orientation flat and a notch in a side surface thereof.

The structure of a laser processing apparatus that can be used in the present invention is not limited to the structure of the laser processing apparatus 2 described above. According to the present invention, the method of manufacturing a monocrystalline silicon substrate may be carried out using a laser processing apparatus including a moving mechanism for moving the holding table 4 in the X-axis directions, the Y-axis directions, and/or the Z-axis directions.

Specifically, a laser processing apparatus that can be used in the present invention is not limited to any structural details insofar as the holding table 4 for holding the ingot 11 thereon and the emission head 16 of the laser beam applying unit 6 for applying the laser beams LB to the ingot 11 can be moved relatively to each other along the X-axis, the Y-axis, and the Z-axis.

Moreover, in the peel-off layer forming step S1 according to the present invention, the straight area, in the ingot 11, that is to be irradiated with the laser beams LB is not limited to a straight area along the crystal orientation [010]. According to the present invention, the laser beams LB may be applied to a straight area along the crystal orientation [001].

Specifically, when the laser beams LB are applied to the ingot 11 in the manner described above, cracks are likely to develop along the following crystal planes.

$$(110),(210),(310),(410),(510),(610),(710),(810),(910),(\underline{10}10) \quad \text{[Math. 3]}$$

$$(\bar{1}10),(\bar{2}10),(\bar{3}10),(\bar{4}10),(\bar{5}14(\bar{6}10),(\bar{7}10),(\bar{8}10),(\bar{9}10),(\underline{\overline{10}}10) \quad \text{[Math. 4]}$$

According to the present invention, further, the laser beams LB may be applied to a straight area, in the ingot 11, that extends along a direction slightly inclined to the crystal orientation [010] or the crystal orientation [001]. This alternative will be described below with reference to FIG. 12.

Figure 12:
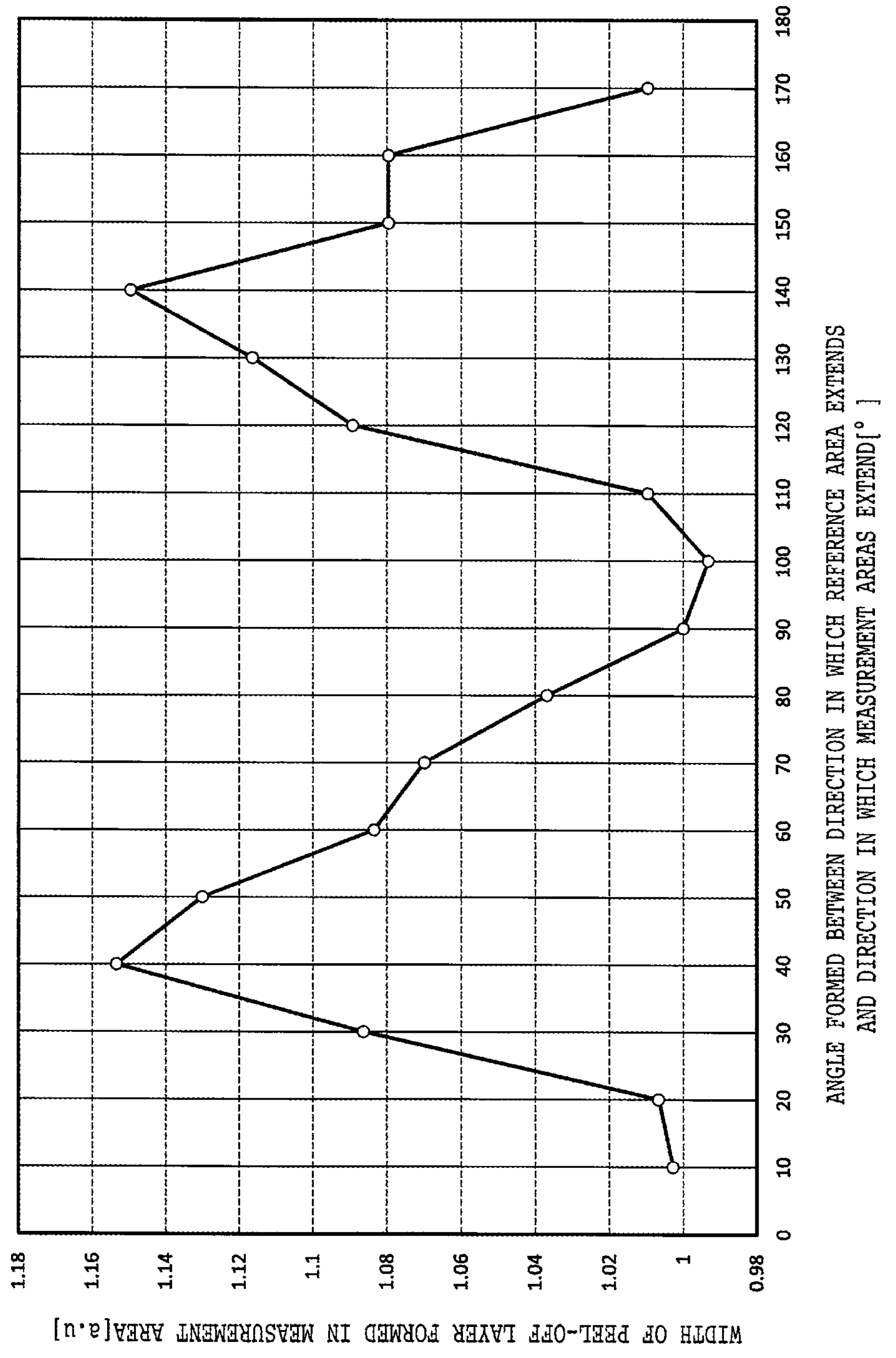
FIG. 12 is a graph illustrating the widths of peel-off layers formed in a workpiece of monocrystalline silicon when laser beams are applied to straight areas along respective different crystal orientations.

FIG. 12 is a graph illustrating the widths, i.e., the width (W) illustrated in FIG. 6B, of peel-off layers formed within a workpiece when laser beams LB are applied to straight areas extending along respective different crystal orientations. The horizontal axis of the graph represents the angles, as viewed in plan, formed between a direction in which a straight area, i.e., a reference area, perpendicular to the crystal orientation [011] extends and directions in which straight areas, i.e., measurement areas, as measurement objects extend.

Specifically, in a case where the horizontal axis of the graph represents an angle of 45°, a straight area along the crystal orientation [001] becomes a measurement object. Similarly, in a case where the horizontal axis of the graph represents an angle of 135°, a straight area along the crystal orientation [010] becomes a measurement object. The vertical axis of the graph represents values obtained by dividing the widths of peel-off layers formed in measurement areas by applying the laser beams LB to the measurement areas by the width of peel-off layer formed in reference area by applying the laser beams LB to the reference area.

As illustrated in FIG. 12, the widths of peel-off layers are wide when the angle formed between the direction in which the reference area extends and the direction in which the measurement areas extend is in the range of 40° to 50° or of 130° to 140°. In other words, the widths of peel-off layers are wide when the laser beams LB are applied to not only straight areas along the crystal orientation [001] or the crystal orientation, [010], but also straight areas along a direction inclined to these crystal orientations at an angle of 5° or less.

In the peel-off layer forming step S1 according to the present invention, consequently, the laser beams LB may be applied to straight areas along a direction inclined at 5° or less, as viewed in plan, to the crystal orientation [001] or the crystal orientation.

In the peel-off layer forming step S1 according to the present invention, more specifically, the laser beams LB may be applied to straight areas along a direction, i.e., a first direction, parallel to the crystal plane, e.g., the crystal plane (100), that is exposed on the face side 11*a* and the reverse side 11*b* of the ingot 11, among particular crystal planes included in the crystal planes {100} and inclined to a particular crystal orientation, e.g., the crystal orientation [001] or the crystal orientation [010], included in the crystal orientations <100> at an angle of 5° or less.

When the peel-off layer forming step S1 is carried out, the indexing-feed step S2 is carried out by moving positions, in the ingot 11, where the focused spots are formed by the applied laser beams LB along a direction, i.e., a second direction, parallel to the crystal plane, e.g., the crystal plane (100), that is exposed on the face side 11*a* and the reverse side 11*b* of the ingot 11, among particular crystal planes included in the crystal planes {100} and perpendicular to the first direction, and the ingot 11 relatively to each other.

According to the present invention, moreover, after peel-off layers 15 have been formed fully in the ingot 11 from the area at the end in the −Y-axis direction of the ingot 11 to the area at the opposite end in the +Y-axis direction of the ingot 11 (step S3: YES), the peel-off layer forming step S1 and the indexing-feed step S2 may be repeatedly carried out. In other words, the laser beams LB for forming peel-off layers 15 may be applied again to the ingot 11 from the area at the end to the area at the opposite end in the Y-axis directions within the ingot 11 in which peel-off layers 15 have already been formed.

According to the present invention, further, after the peel-off layer forming step S1 but before the indexing-feed step S2, the peel-off layer forming step S1 may be carried out again. In other words, the laser beams LB for forming peel-off layers 15 may be applied to a straight area in the ingot 11 in which straight area peel-off layers 15 have already been formed.

When the peel-off layer forming step S1 is performed on an area of the ingot 11 in which area peel-off layers 15 have already been formed, the density of the modified regions 15*a* and the cracks 15*b* contained in the peel-off layer 15 that has already been formed in the ingot 11 is increased, thereby making it easier to separate the substrate 17 from the ingot 11 in the separating step S4.

In this case, further, the cracks 15*b* contained in the peel-off layers 15 are further developed to increase the widths, i.e., the width (W) illustrated in FIG. 6B, of the peel-off layers 15. Therefore, the indexed distance that the emission head 16 of the laser beam applying unit 6 moves in the indexing-feed step S2 is increased.

According to the present invention, moreover, forming peel-off layers 15 fully in the ingot 11 in the peel-off layer forming step S1 is not an essential feature of the invention. Providing that the separating step S4 carried out using the separating apparatus 18, for example, makes it possible to develop cracks 15*b* in an area in the vicinity of the side surface 11*c* of the ingot 11, peel-off layers 15 may not be formed partly or wholly in the area in the vicinity of the side surface 11*c* of the ingot 11 in the peel-off layer forming step S1.

The separating step S4 according to the present invention may be carried out by an apparatus other than the separating apparatus 18 illustrated in FIGS. 11A and 11B. In the separating step S4 according to the present invention, for example, the substrate 17 may be separated from the ingot 11 by attracting the face side 11*a* of the ingot 11 under suction.

Figure 13A:
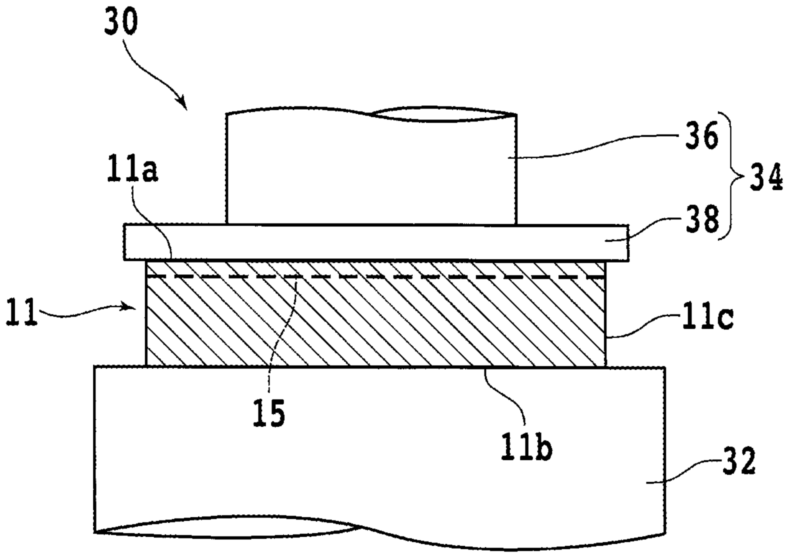
FIG. 13A is a schematic side elevational view, partly in cross section, illustrating another example of the manner in which a substrate is separated from the ingot.
Figure 13B:
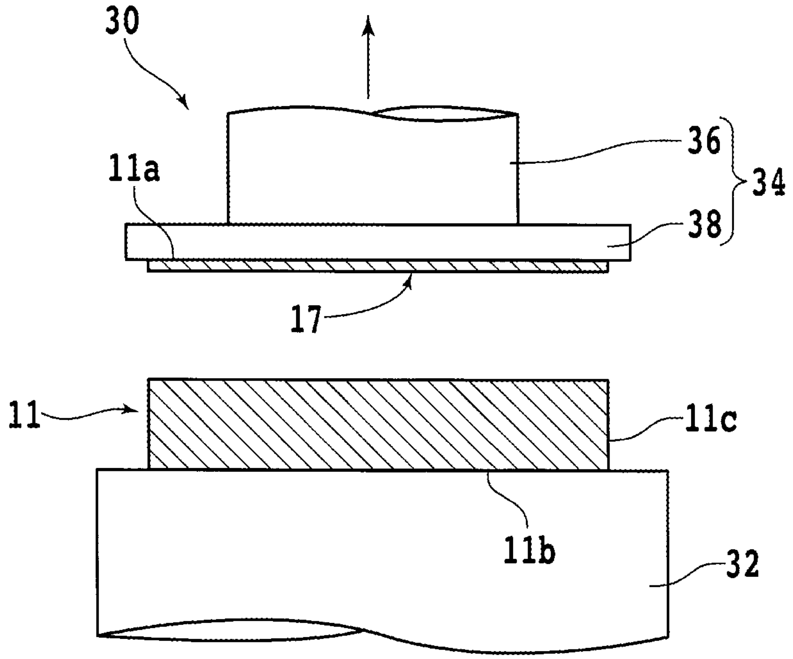
FIG. 13B is a schematic side elevational view, partly in cross section, illustrating another example of the manner in which the substrate is separated from the ingot.

FIGS. 13A and 13B schematically illustrate, in side elevation, partly in cross section, an example of the manner in which the substrate 17 is separated from the ingot 11 according to such a modification as described above. A separating apparatus 30 illustrated in FIGS. 13A and 13B has a holding table 32 for holding thereon the ingot 11 with the peel-off layers 15 formed therein.

The holding table 32 has a circular upper surface as a holding surface where a porous plate, not illustrated, is exposed. The porous plate is fluidly connected to a suction source, not illustrated, such as a vacuum pump, through a fluid channel or the like, not illustrated, defined in the holding table 32. When the suction source is actuated, it generates a negative pressure through the fluid channel to a space in the vicinity of the holding surface of the holding table 32, thereby holding the ingot 11 under suction on the holding surface.

A separating unit 34 is disposed above the holding table 32. The separating unit 34 has a cylindrical support member 36 having an upper portion to which there is coupled a ball-screw-type lifting and lowering mechanism, not illustrated, for example. When the ball-screw-type lifting and lowering mechanism is actuated, it selectively lifts and lowers the separating unit 34.

The support member 36 has a lower end fixed centrally to an upper portion of a disk-shaped suction plate 38. The suction plate 38 has a plurality of suction ports defined in a lower surface thereof and fluidly connected to a suction source, not illustrated, such as a vacuum pump, through a fluid channel or the like, not illustrated, defined in the suction plate 38. When the suction source is actuated, it generates a negative pressure through the fluid channel to a space in the vicinity of the lower surface of the suction plate 38, thereby attracting the ingot 11 under suction to the lower surface of the suction plate 38.

The separating apparatus 30 operates to carry out the separating step S4 according to the following sequence of events. First, the ingot 11 is placed on the holding table 32 such that the center of the reverse side 11*b* of the ingot 11 with the peel-off layers 15 formed therein and the center of the holding surface of the holding table 32 are aligned with each other.

Then, the suction source fluidly connected to the porous plate exposed on the holding surface is actuated to hold the ingot 11 under suction on the holding table 32. Thereafter, the lifting and lowering mechanism is operated to lower the separating unit 34 to bring the lower surface of the suction plate 38 into contact with the face side 11*a* of the ingot 11.

Then, the suction source fluidly connected to the suction ports in the suction plate 38 is actuated to attract the face side 11*a* of the ingot 11 under suction to the lower surface of the suction plate 38 (see FIG. 13A). Then, the lifting and lowering mechanism is operated to lift the separating unit 34 to move the suction plate 38 away from the holding table 32 (see FIG. 13B).

At this time, upward forces are exerted on the portion of the ingot 11 closer to the face side 11*a*, of the ingot 11, that is attracted under suction to the suction plate 38 through the suction ports. As a result, the cracks 18*b* contained in the peel-off layers 15 are further developed, separating the portion of the ingot 11 closer to the face side 11*a* of the ingot 11 and the portion of the ingot 11 closer to the reverse side 11*b* of the ingot 11 from each other. In other words, a substrate 17 is manufactured from the ingot 11 along the peel-off layers 15 that act as separation initiating points.

According to the present invention, in the separating step S4, ultrasonic waves may be applied to the face side 11*a* of the ingot 11 prior to separating the portion of the ingot 11 closer to the face side 11*a* of the ingot 11 and the portion of the ingot 11 closer to the reverse side 11*b* of the ingot 11 from each other. In this case, inasmuch as the cracks 23 contained in the peel-off layers 15 are further developed by the applied ultrasonic waves, the portion of the ingot 11 closer to the face side 11*a* of the ingot 11 and the portion of the ingot 11 closer to the reverse side 11*b* of the ingot 11 can be separated more easily from each other.

According to the present invention, moreover, prior to the peel-off layer forming step S1, the face side 11*a* of the ingot 11 may be planarized by grinding or polishing (planarizing step). The planarizing step may be carried out when a plurality of substrates are manufactured from the ingot 11. Specifically, when a substrate 17 is manufactured by being separated from the ingot 11 along the peel-off layers 15, the newly exposed surface of the ingot 11 has surface irregularities reflecting a distribution of modified regions 15*a* and cracks 15*b* contained in the peel-off layers 15.

Consequently, when a new substrate is to be manufactured from the ingot 11, it is preferable to planarize the surface of the ingot 11 prior to the peel-off layer forming step S1. The planarized surface of the ingot 11 reduces irregular reflections of the laser beams LB applied to the ingot 11 in the peel-off layer forming step S1. According to the present invention, the newly exposed surface of the substrate 17 that has been separated from the ingot 11 along the peel-off layers 15 may also be planarized by grinding or polishing.

According to the present invention, further, a substrate may be manufactured from a bare wafer as a workpiece that is made of monocrystalline silicon that has been manufactured such that a particular crystal plane included in crystal planes {100} is exposed on face and reverse sides thereof.

The bare wafer is twice to five times thicker than the substrate to be manufactured therefrom, for example. The bare wafer is manufactured by being separated from the ingot 11 according to the same process as the method described above. It can thus be phrased that the substrate is manufactured from the ingot 11 by repeating the above method twice.

According to the present invention, moreover, a substrate may be manufactured from a device wafer as a workpiece that is fabricated from the above bare wafer with semiconductor devices formed thereon.

The structure, method, etc., according to the above embodiment may be changed or modified appropriately without departing from the scope of the present invention.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. A method of manufacturing a monocrystalline silicon substrate from a workpiece of monocrystalline silicon that has been manufactured such that a particular crystal plane included in crystal planes {100} is exposed on face and reverse sides thereof, the method comprising:
   - a peel-off layer forming step of moving a focused spot, positioned within the workpiece, of a laser beam that is applied to the workpiece and that has a wavelength transmittable through the monocrystalline silicon and the workpiece relatively to each other along a first direction that is parallel to the particular crystal plane and that is inclined to a particular crystal orientation included in crystal orientations <100> by an angle of 5° or less, thereby forming a peel-off layer in a straight area in the workpiece along the first direction;
   - an indexing-feed step of moving a position where the focused spot of the laser beam is formed and the workpiece relatively to each other along a second direction parallel to the particular crystal plane and perpendicular to the first direction; and
   - a separating step of separating a substrate from the workpiece along peel-off layers in the workpiece that act as separation initiating points, after the peel-off layer forming step and the indexing-feed step have been repeated,
   - wherein the peel-off layer forming step includes a step of moving the focused spot and the workpiece relatively to each other in order to move the focused spot from an inside of the workpiece toward an outside of the workpiece.

* * * * *